(12) United States Patent  
Kirtland (10) Patent No.: US 11,642,925 B2  
(45) Date of Patent: May 9, 2023

(54) CLAMPING HITCH RECEIVER

(71) Applicant: Ralph Preston Kirtland, Staunton, VA (US)

(72) Inventor: Ralph Preston Kirtland, Staunton, VA (US)

( * ) Notice: Subject to any disclaimer, the term of this patent is extended or adjusted under 35 U.S.C. 154(b) by 0 days.

(21) Appl. No.: 17/171,048

(22) Filed: Feb. 9, 2021

(65) Prior Publication Data

US 2022/0250427 A1 Aug. 11, 2022

(51) Int. Cl.
*B60D 1/48* (2006.01)

(52) U.S. Cl.
CPC ...................... *B60D 1/48* (2013.01)

(58) Field of Classification Search
CPC ....................................... B60D 1/48
USPC ....................................... 280/506
See application file for complete search history.

(56) References Cited

U.S. PATENT DOCUMENTS

| | | | | |
|---|---|---|---|---|
| 8,419,041 B2* | 4/2013 | Bessette | ................... | B60D 1/52 280/506 |
| 8,944,516 B2* | 2/2015 | Eidsmore | ................... | B60P 1/28 280/506 |
| 2006/0208456 A1* | 9/2006 | Weaver | ................... | B60D 1/52 280/491.5 |
| 2011/0210530 A1* | 9/2011 | Hancock | ................... | B60D 1/02 280/506 |
| 2014/0084568 A1* | 3/2014 | Lahn | ................... | B60D 1/241 280/506 |
| 2015/0076793 A1* | 3/2015 | Belinky | ................... | B60D 1/605 280/506 |

* cited by examiner

*Primary Examiner* — Minnah L Seoh  
*Assistant Examiner* — Felicia L. Brittman (57) ABSTRACT

A hitch receiver with four walls forming a tube that includes an integrated clamping device for immobilizing inserted accessories. A flexible tube wall acts as a pressure plate to press against the accessory as force is applied. The clamping device further utilizes a backstop attached to a rigid portion of the tube and accommodating a mechanism for generating force. Force can be generated mechanically via a threaded rod operatively connected to a threaded opening in a block located in the space between the backstop and the pressure plate. Clamping force is applied to the pressure plate by the tip of the threaded rod as it is turned in such a way as to force the threaded block against the backstop. Force is applied until the pressure plate deforms, contacts the adjacent wall of the inserted accessory, and presses the accessory against the opposite tube wall.

8 Claims, 10 Drawing Sheets

CLAMPING HITCH RECEIVER

FIELD OF THE INVENTION

This invention is related to a clamping hitch receiver stabilizing system for immobilizing various connected accessories in a hitch receiver.

BACKGROUND OF THE INVENTION

Hitch receivers are commonly used for attaching accessories to vehicles. The accessories are bicycle racks, cargo baskets, or various carriers and the like, as well as the conventionally-used towing hitches and they are usually attached to a vehicle at its back end. Typically, a hitch receiver is a tube which is substantially square in cross-section (often with rounded corners) and attached to the vehicle beneath a rear bumper. The accessory is typically intended to support and hold one or more bicycles, cargo, or other similar articles.

The typical hitch receiver is ideal for supporting the typical accessory because the hitch receiver is located at the back end of the vehicle and is securely attached to the vehicle. For example, the hitch receiver is commonly welded or otherwise secured to a chassis or frame of the vehicle, though bumper-mounted hitches mounted on tube type bumpers are growing in popularity due to the growth in RV (Recreational Vehicle) sales.

Various devices for connecting an accessory to a hitch receiver are known, but such devices suffer from a number of imperfections or weaknesses. Many of these imperfections arise because of the requirements that the connecting device should be easy to insert into the hitch receiver, and easy to attach securely to the hitch receiver after insertion. For example, accessories connected to hitch receivers by known devices tend to wobble relative to the hitch receiver (and the vehicle) as the vehicle travels, even where the connection is relatively secure. If not secured again to the hitch receiver after wobbling starts, the connecting device can gradually become less secure, even to the extent of disconnection. In addition, wobbling movement of the accessory relative to the hitch receiver can lead to the bicycles or other cargo on the accessory being jarred loose, and falling off the accessory. Also, known connecting devices do not provide for relatively fast and simple disconnection of the accessory from the hitch receiver.

Threaded bolts are often used to minimize movement of the accessory relative to the hitch receiver. This is an inadequate solution due to the damage caused to the accessory where the threaded bolt directly contacts the accessory. Due to the small surface area of the threaded bolt tip along with the typical thin tube wall of the accessory, generating sufficient force to stabilize the accessory often results in a noticeable dent in the accessory. Examples of these can be seen by searching the Internet for RV bumper-mounted hitches.

External devices can also be employed to minimize movement, such as the ornamental design demonstrated by Wyers in patent D849,610 and as seen by searching the Internet for hitch anti-rattle devices. These devices employ a clamping action but, as they are external to the hitch, they are limited in the amount of movement they can restrict. By clamping at one end of the hitch, they effectively create a pivot point around which the furthest end of the accessory can still move due to the difference in size between the interior of the hitch and the exterior of the accessory.

With this invention, the approach was taken to generate clamping force within the hitch body and to do so in such a way as to minimize risk of damage to the accessory. By utilizing a pressure plate, greatly increased amounts of force could be generated to eliminate accessory movement without causing damage to the accessory in all but the most extreme circumstances. By having the clamping force at or near the center of the hitch, a stable triangle of resistance is created by the contact points of the pressure plate (typically deformed into a curve), the outer edge of the hitch opening, and the innermost end of the accessory.

The invention described herein satisfies the need for an improved clamping device for connecting an accessory to a hitch receiver that satisfies the ease-of-attachment requirement as well as solving the accessory movement and damage problems inherent with previously-described solutions.

SUMMARY OF THE INVENTION

The present invention provides a clamping device for immobilizing an accessory within a hitch receiver with an outward end defining an opening and four rigid walls forming a tube with the invention modifying one of the rigid walls of the receiver hitch with a pressure plate that is flexible enough to press down tightly against the corresponding wall of the inserted portion of an accessory when force is applied. The clamping device works by generating an expanding force between an immovable backstop and a flexible pressure plate, all of which are components of the hitch. The backstop is either rigidly attached to the main body of the hitch or, through movable interconnections, becomes rigidly attached under load. The expanding force is generated by a threaded bolt mated to a block via a threaded hole. The block either comprises the backstop or is secured in place by the backstop. The bolt is operatively engaged with a wrench or similar tightening device, the rotation thereof pushing the pressure plate away from the backstop and toward the nearest wall of the accessory inserted into the hitch receiver.

The pressure plate may be a separate, free-floating component.

The pressure plate may be a flexible section of an otherwise rigid wall of the hitch.

The pressure plate may be of such material that it retains a curve once deformed.

The pressure plate may be of such material that it does not retain a curve once deformed.

The backstop may be rigidly attached to the main body of the hitch.

The backstop may, through movable interconnections, become rigidly attached to the main body of the hitch when under load.

The bolt and block with threaded hole may be operable by rotational tightening to urge the pressure plate against the corresponding wall of the accessory inserted into the hitch receiver.

The bolt and block with threaded hole may be operable by rotational loosening to relieve the pressure generated by the pressure plate against the corresponding wall of the accessory inserted into the hitch receiver.

BRIEF DESCRIPTION OF THE DRAWINGS

The invention will be better understood with reference to the attached drawings, in which.

DETAILED DESCRIPTION OF THE PREFERRED EMBODIMENT(S)

Figure 1A:
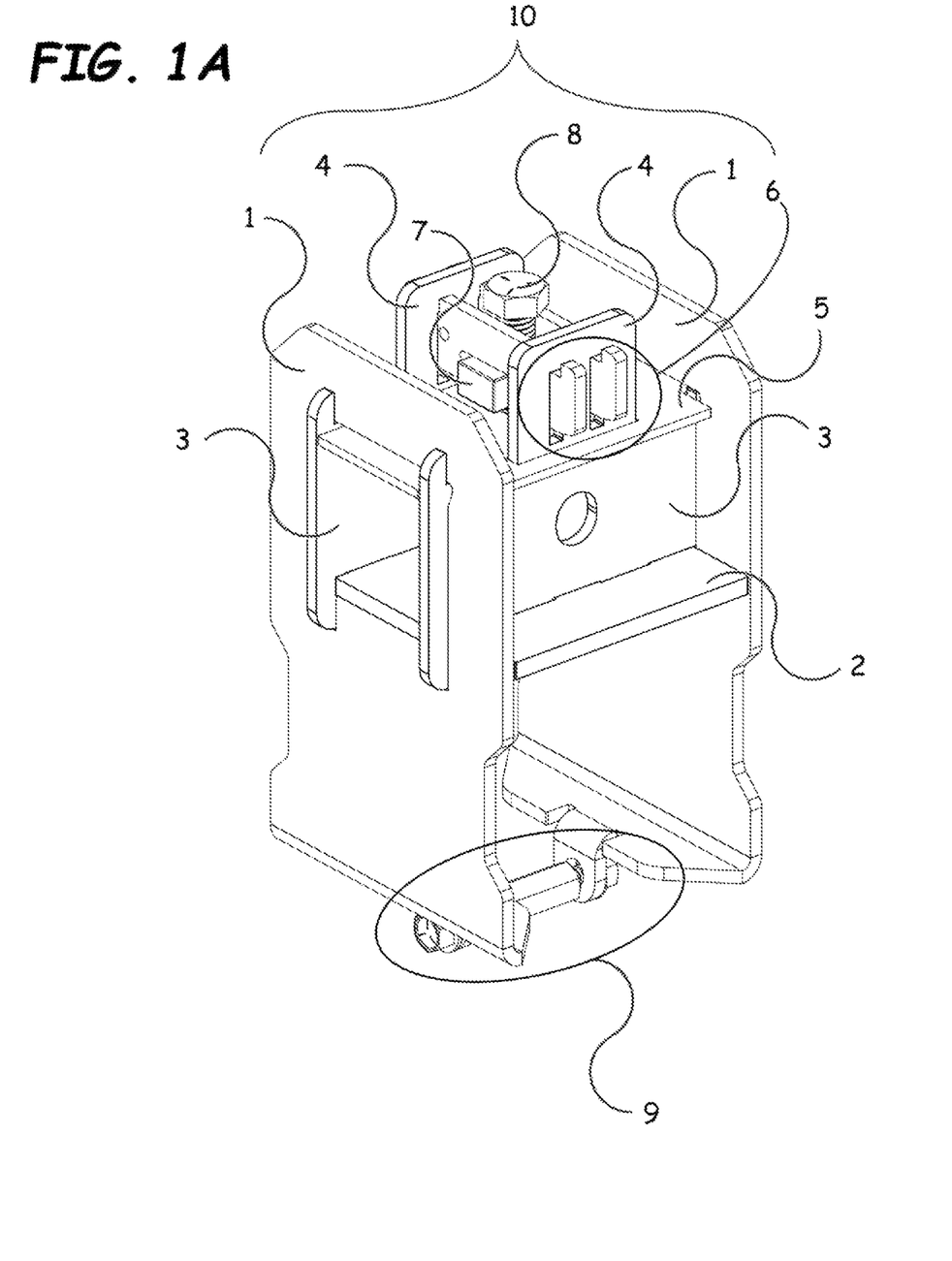
FIG. 1A is a solid isometric view of a preferred embodiment of the clamping hitch in an assembled, multi-piece configuration for mounting to a square tube.

FIG. 1A details the subcomponents integrated into final assembly 10 which is the invention. Faceplates 1 interlock with subassembly comprised of base plate 2, side plates 3, and pressure plate 5 and held together by fastener assembly 9. Side plate tabs 4 protrude above pressure plate 5 and interlock with backstop plates 6. Threaded block 7 seats across corresponding notches in backstop plates 6. Bolt 8 is placed between backstop plates 6 and threaded through threaded block 7 until tip contacts pressure plate 5 and threaded block 7 lifts backstop plates 6 until they are stopped due to interference with side plate tabs 4. Additional threading creates pressure against pressure plate 5 causing it to press downward.

Figure 1B:
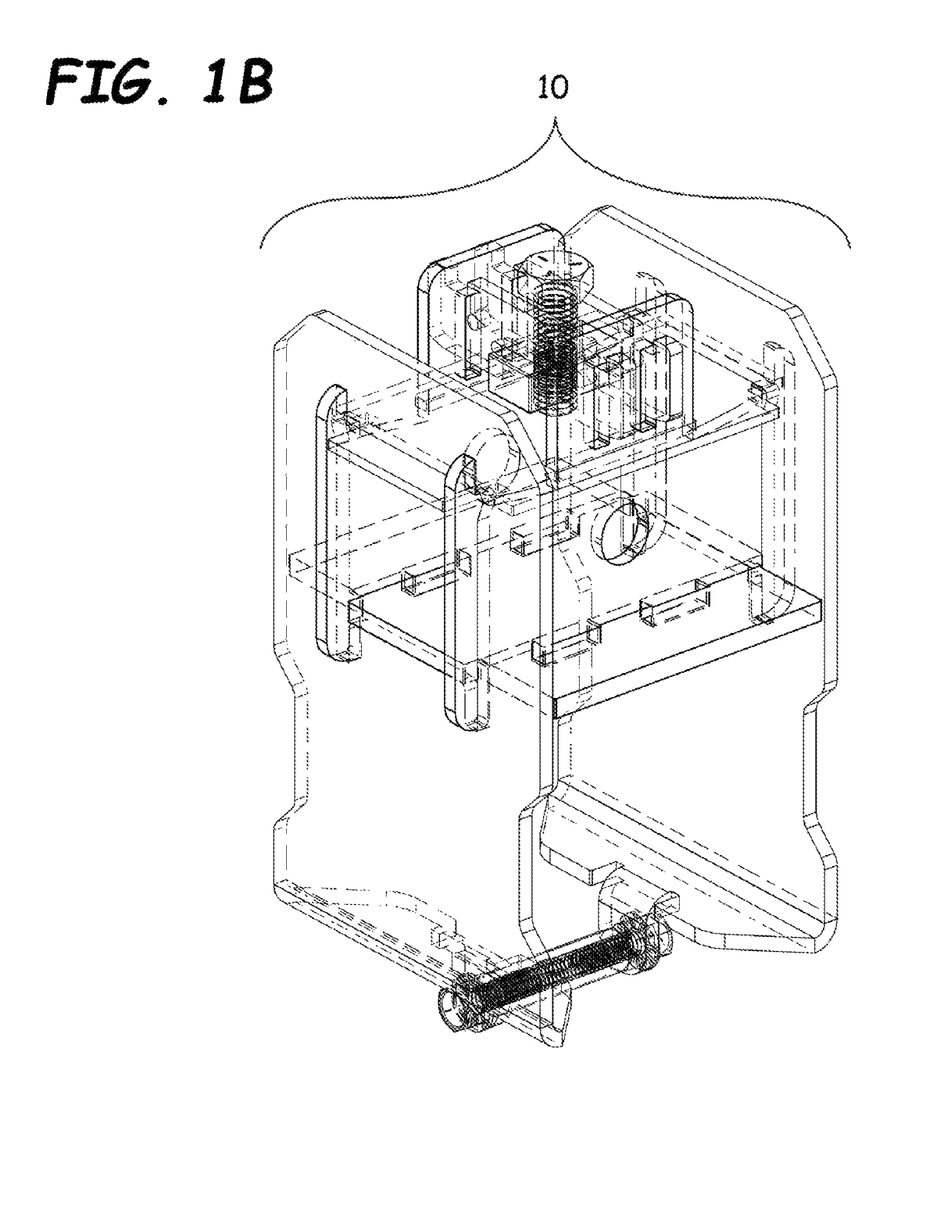
FIG. 1B is a transparent isometric view of a preferred embodiment of the clamping hitch in an assembled, multi-piece configuration for mounting to a square tube.

FIG. 1B shows a transparent view of the components in final assembly 10.

Figure 1C:
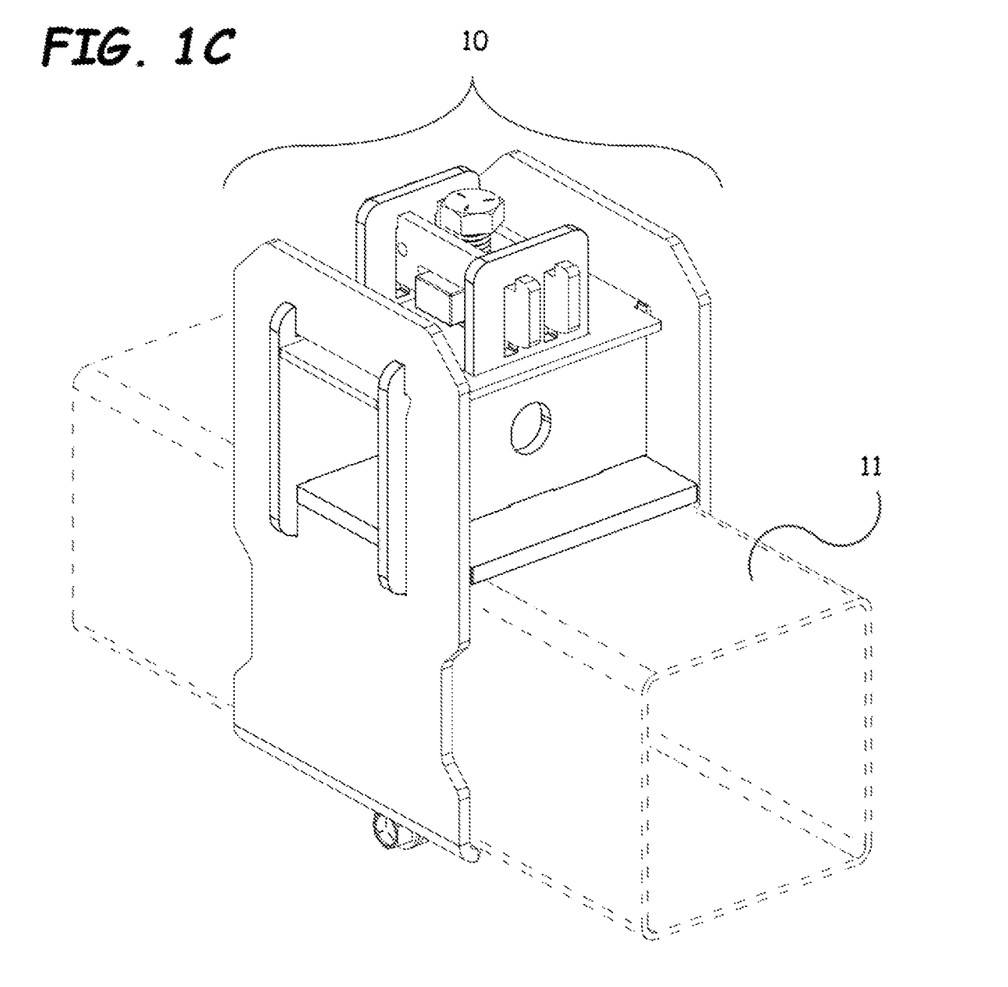
FIG. 1C is a solid isometric view of a preferred embodiment of the clamping hitch in an assembled, multi-piece configuration mounted to a square tube with hitch receiver opening above the square tube.

FIG. 1C shows final assembly 10 mounted with hitch receiver opening above square tube segment 11.

Figure 1D:
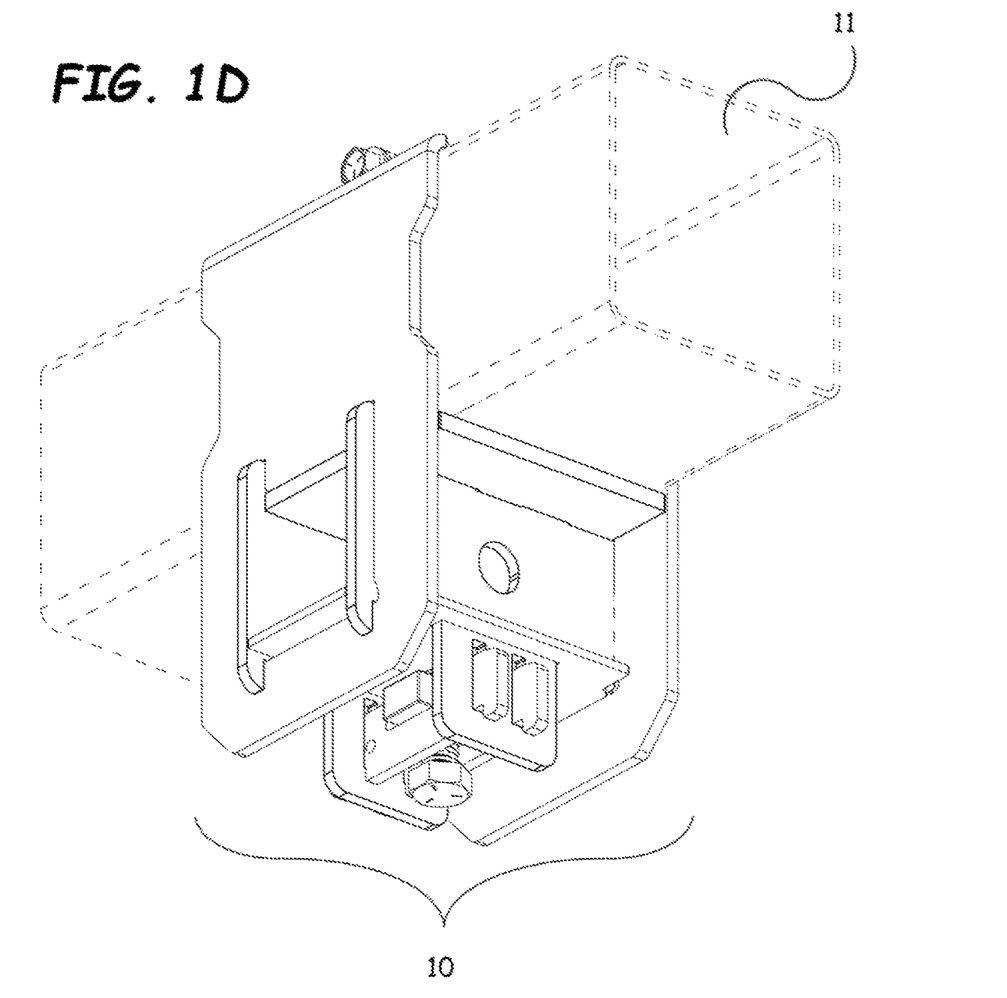
FIG. 1D is a solid isometric view of a preferred embodiment of the clamping hitch in an assembled, multi-piece configuration mounted to a square tube with hitch receiver opening below the square tube.

FIG. 1D shows final assembly 10 mounted with hitch receiver opening below square tube segment 11.

Figure 2A:
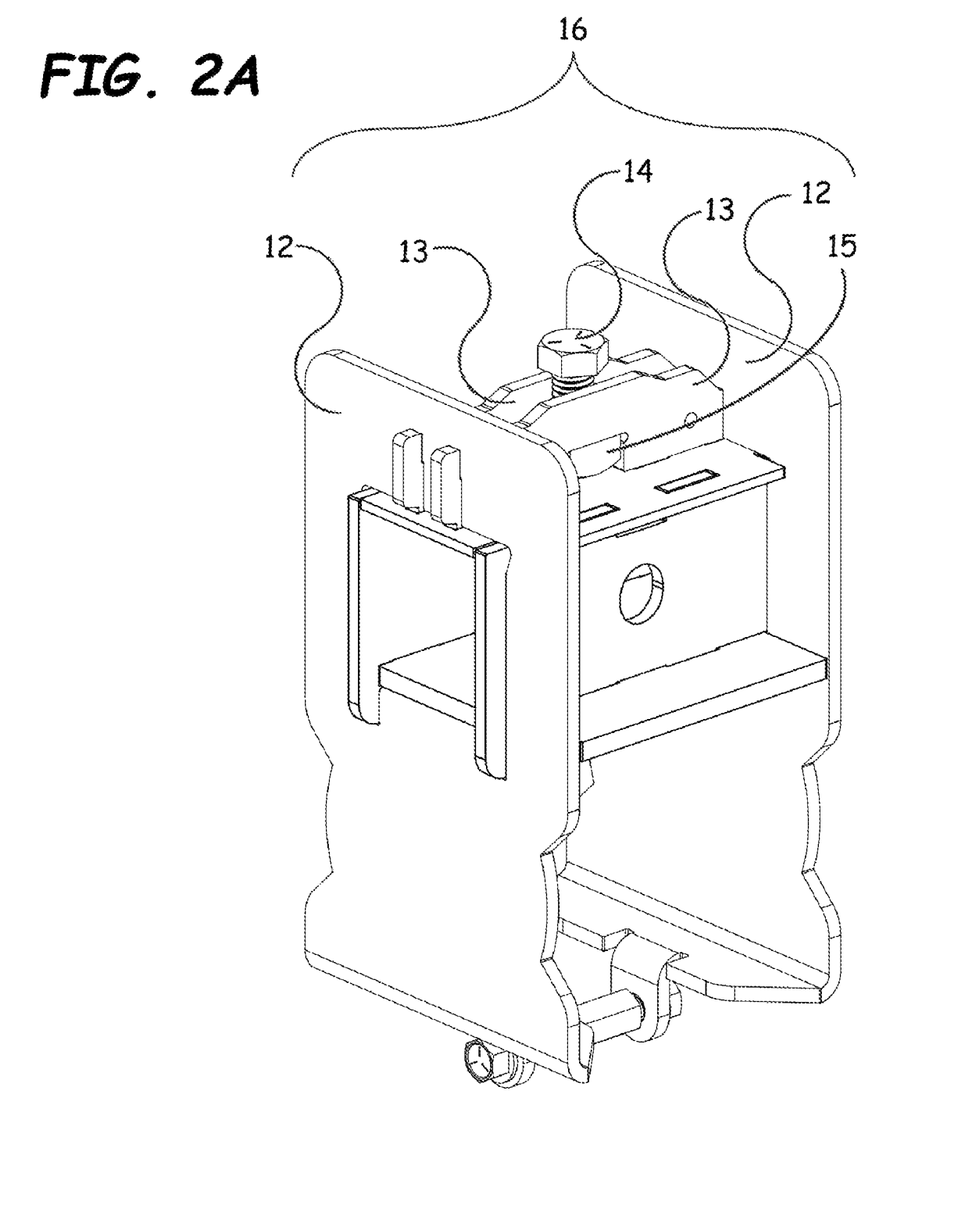
FIG. 2A is a solid isometric view of a preferred embodiment of the clamping hitch in an assembled, multi-piece configuration for mounting to a square tube with an alternate interconnection of the backstop plates.

FIG. 2A details the subcomponents integrated into final assembly 16 which is an alternate embodiment of the invention. Faceplates 12 interlock directly with backstop plates 13. Threaded nut 15 seats across corresponding notches in backstop plates 13. Bolt 14 is placed between backstop plates 13 and threaded through threaded nut 15 with subsequent operation proceeding as in previous embodiment.

Figure 2B:
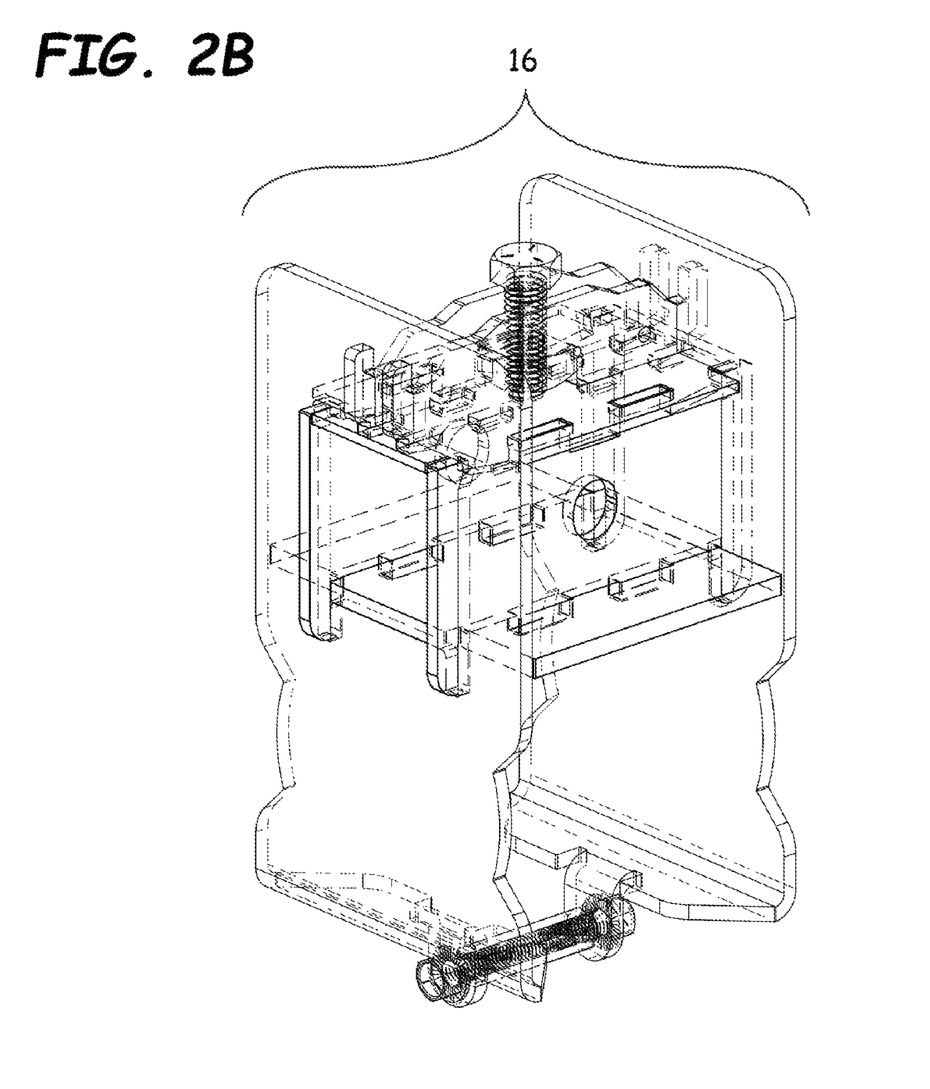
FIG. 2B is a transparent isometric view of a preferred embodiment of the clamping hitch in an assembled, multi-piece configuration for mounting to a square tube with an alternate interconnection of the backstop plates.

FIG. 2B shows a transparent view of the components in final assembly 16.

Figure 3A:
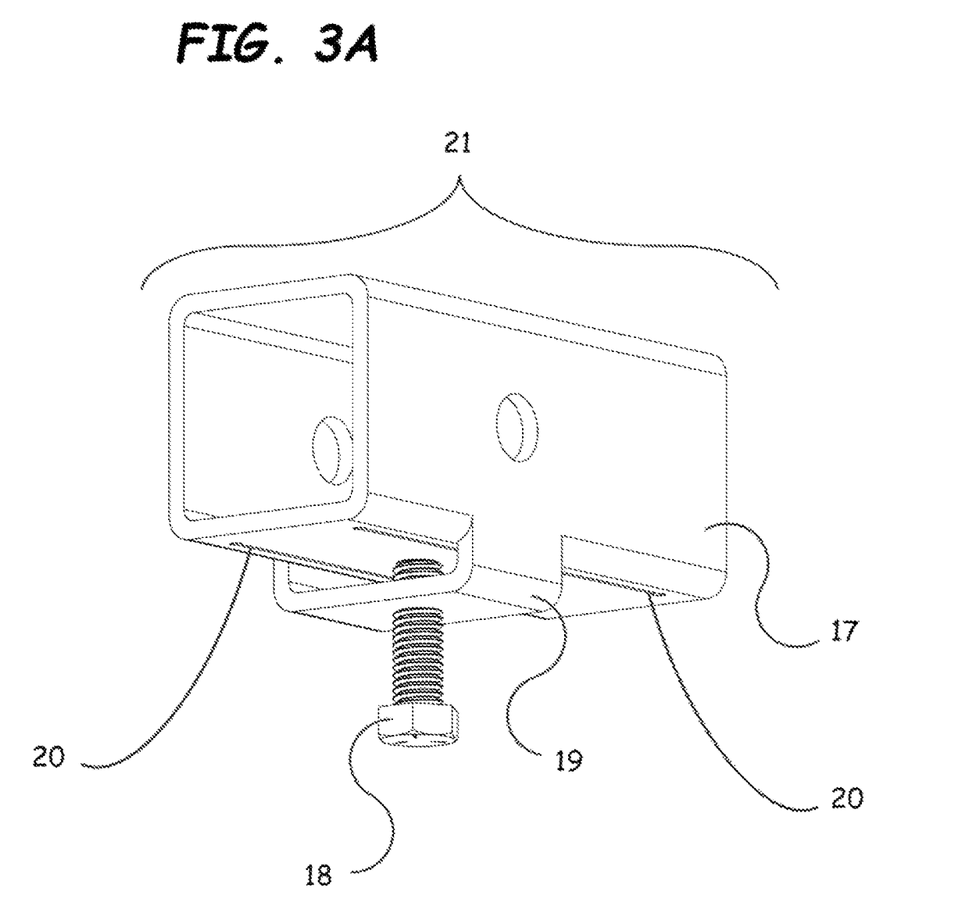
FIG. 3A is a solid acute-angle isometric view of a preferred embodiment of the clamping hitch in a single-piece configuration for mounting to underside of a vehicle frame component.

FIG. 3A details the subcomponents integrated into final assembly 21 which is an alternate embodiment of the invention. Hitch body 17 has an integrated backstop 19 incorporating a threaded hole through which bolt 18 is threaded. Slots 20 are cut into hitch body 17 to create a flexible section between them to act as the pressure plate. Bolt 18 is threaded through the hole in backstop 19 until it contacts the pressure plate formed between slots 20. Further threading of bolt 18 through backstop 19 will deform the pressure plate area between slots 20, creating pressure against an accessory inserted into the hitch.

Figure 3B:
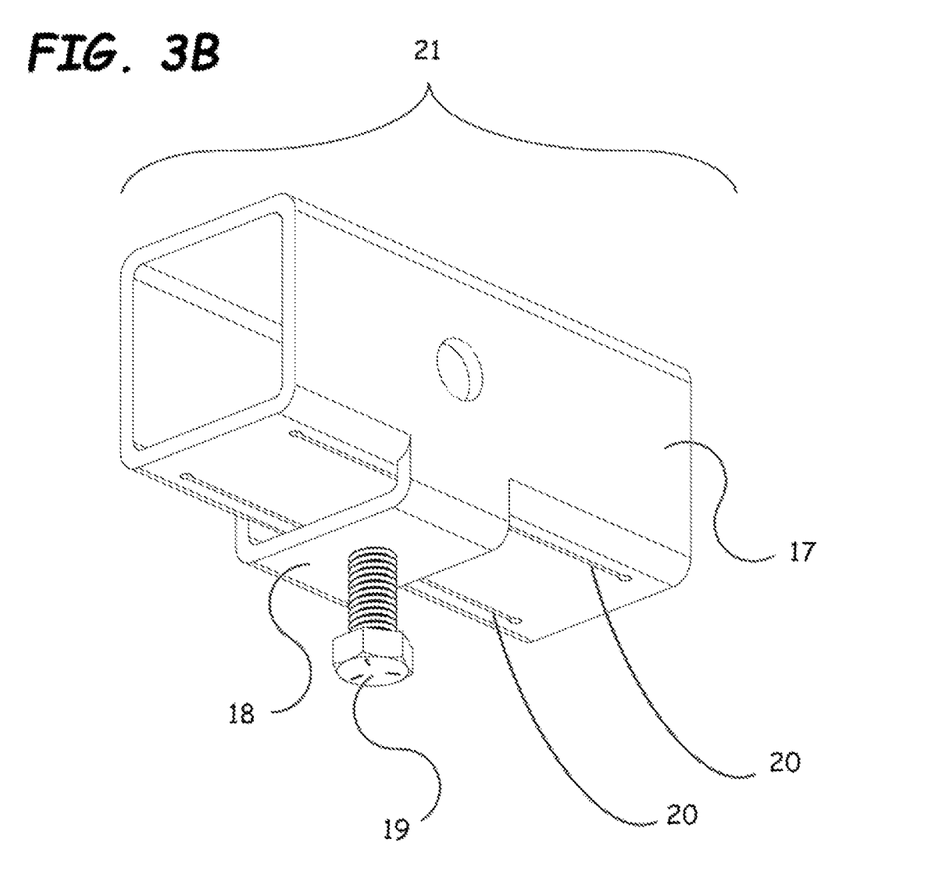
FIG. 3B is a solid isometric view of a preferred embodiment of the clamping hitch in a single-piece configuration for mounting to underside of a vehicle frame component.

FIG. 3B details the subcomponents integrated into final assembly 21 which is an alternate embodiment of the invention. Hitch body 17 has an integrated backstop 19 incorporating a threaded hole through which bolt 18 is threaded. Slots 20 are cut into hitch body 17 to create a flexible section between them to act as the pressure plate. Bolt 18 is threaded through the hole in backstop 19 until it contacts the pressure plate formed between slots 20. Further threading of bolt 18 through backstop 19 will deform the pressure plate area between slots 20, creating pressure against an accessory inserted into the hitch.

Figure 3C:
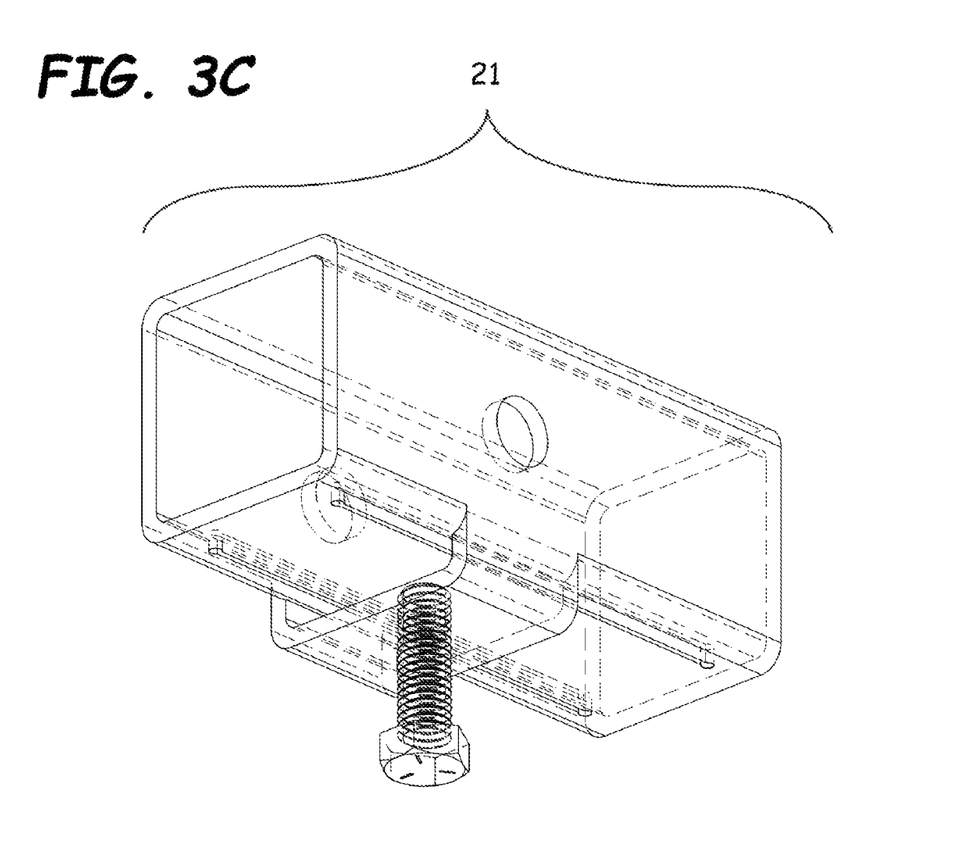
FIG. 3C is a transparent isometric view of a preferred embodiment of the clamping hitch in a single-piece configuration for mounting to underside of a vehicle frame component.

FIG. 3C shows a transparent view of the components in final assembly 21.

Figure 3D:
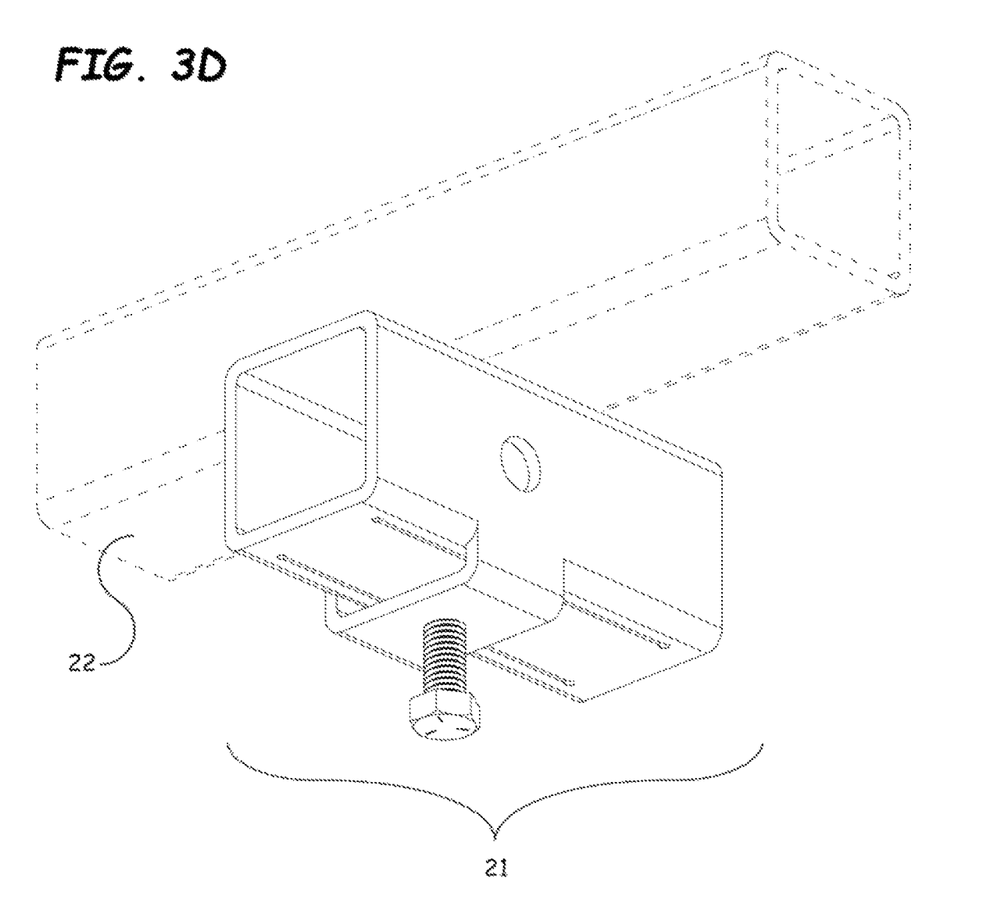
FIG. 3D is a solid isometric view of a preferred embodiment of the clamping hitch in a single-piece configuration mounted to the underside of a representative segment of a vehicle frame component.

FIG. 3D shows final assembly 21 mounted to the underside of a vehicle frame component 22.

The invention claimed is:

1. A stabilizing apparatus incorporated into a vehicle hitch receiver comprised of individual interlocking components that in concert form the body of said hitch receiver, the hitch receiver having four parallel walls connected so as to form a tube for receiving accessories, the stabilizing apparatus limiting free-play movement of an accessory inserted thereto, the stabilizing apparatus comprising:
   a movable or flexible pressure plate incorporated into or replacing one of the hitch receiver's four walls;
   an immovable backstop attached to the rigid body of the hitch;
   a block integrated into said immovable backstop incorporating a threaded hole;
   a threaded bolt screwably engageable with said threaded hole of said block so as to force said pressure plate away from the backstop and toward said inserted accessory, clamping said accessory between the pressure plate and the opposing wall of the hitch receiver.

2. The stabilizing apparatus as recited in claim 1 wherein said individual interlocking components include components to enclose and secure a square tube oriented perpendicular to the tube formed by said hitch receiver.

3. The stabilizing apparatus as recited in claim 2, wherein said backstop is formed by parallel plates notched to receive said block with a threaded hole, said backstop interconnected and transferring force to said hitch receiver's face plates which in turn interconnect and transfer force to said perpendicularly-oriented square tube.

4. The stabilizing apparatus as recited in claim 2, wherein said backstop is formed by parallel plates notched to receive said block with a threaded hole, said backstop interconnected and transferring force to hitch receiver side plates which in turn interconnect and transfer force to hitch receiver face plates which in turn interconnect and transfer force to said perpendicularly-oriented square tube.

5. Currently amended: The stabilizing apparatus as recited in claim 1, wherein said backstop is formed by parallel plates notched to receive said block with a threaded hole, said backstop interconnected and transferring force to hitch receiver side plates which in turn interconnect and transfer force to hitch receiver face plates.

6. The stabilizing apparatus as recited in claim 1, wherein said backstop is formed by parallel plates notched to receive said block with a threaded hole, said backstop interconnected and transferring force to hitch receiver face plates.

7. The stabilizing apparatus as recited in claim 1, comprised of a single-piece body of the hitch receiver formed by a square tube with said backstop an integral component and positioned outboard of a slotted wall of said tube whereby the area of said slotted wall between the slots acts as said pressure plate when engaged by said bolt screwably engaged in a threaded hole in said integral backstop.

8. The stabilizing apparatus as recited in claim 7, whereby said square tube is attached to a vehicle's frame.

* * * * *